Patented Apr. 28, 1925.

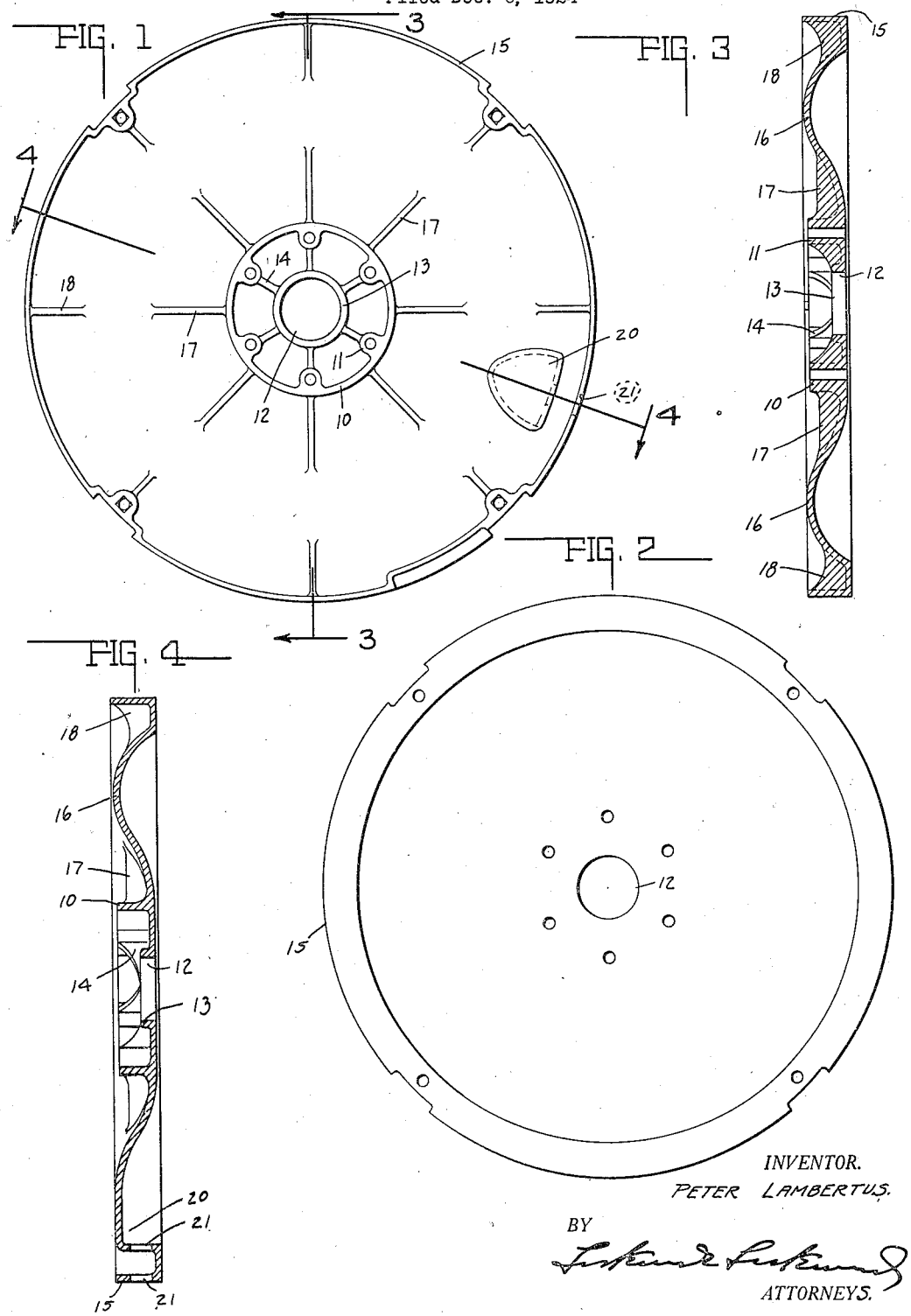

1,535,121

UNITED STATES PATENT OFFICE.

PETER LAMBERTUS, OF INDIANAPOLIS, INDIANA.

VEHICLE WHEEL.

Application filed December 6, 1924. Serial No. 754,336.

*To all whom it may concern:*

Be it known that I, PETER LAMBERTUS, a citizen of the United States, and a resident of Indianapolis, county of Marion, and State of Indiana, have invented a certain new and useful Vehicle Wheel; and I do hereby declare that the following is a full, clear, and exact description thereof, reference being had to the accompanying drawings, in which like numerals refer to like parts.

This invention pertains to a vehicle wheel of the disk type, particularly adapted for use on automobiles.

The principal feature of the invention resides in the construction of the wheel, whereby it is possible to construct a wheel cast of aluminum alloy or the like, and still permit of the particular use of such a cast wheel by reason of the manner of strengthening and bracing it against vertical as well as lateral strain. This is accomplished by providing the usual annular bulge intermediate the rim and hub and bracing the same by means of a plurality of spoke like radially extending webs joining the hub with the inner surface of the bulged portion and the rim with the outer surface thereof, said webs being formed integral therewith, the portions thereof in alignment, as will be hereinafter more fully and specifically set forth.

The full nature of the invention will be understood from the accompanying drawings and the following description and claims:

In the drawings, Figure 1 is a plan view of the inner side of the wall. Fig. 2 is a plan view of the outer side thereof. Fig. 3 is a section taken on the line 3—3 of Fig. 1. Fig. 4 is a section taken on the line 4—4 of Fig. 1.

In the drawings, there is shown a cast aluminum alloy wheel having an annular cup-shaped hub portion 10 provided with the lugs 11 about the inner periphery thereof, through which bolts may pass for securing the wheel to the spindle or brake drum of the vehicle. The hub portion is provided with a reduced opening 12 through which the spindle may extend in the usual manner. The opening 12 is surrounded by the inwardly-extending bead or flange 13 which is connected with the lugs 11 by the radially-extending ribs or webs 14 for reinforcing and strengthening the hub portion. The disk portion of the wheel terminates in the flanged outer annular rim 15 and is provided intermediate of said rim and hub with an annular dished or bulging portion 16 for bracing and strengthening the wheel against lateral strain, as is customary with the usual type of disk wheels.

Intermediate the annular hub portion 10 and the bulged portion 16 of the wheel and on the inner surface thereof there are a plurality of radially-extending ribs or webs 17 cast integral with the hub and disk portions so as to merge into the curved surface of the latter. Similar ribs or webs 18 are likewise formed intermediate the rim and bulged portion of the disk, cast integral therewith and merging into the latter. Said ribs or webs 17 and 18 extend radially outward from the hub and are in alignment with each other so as to virtually form in conjunction with the bulged portion of the disk a set of radially extending spoke-like ribs, which serve to completely support and strengthen the wheel intermediate the rim and hub in the same manner as in spoke wheels. Thus the cast aluminum or alloy disk wheel is sufficiently strengthened against both vertical and lateral stress and strain to enable it to stand up under the same punishment as the ordinary spoke wheels or pressed steel wheels.

At one point about the periphery of the wheel there is provided a recess 20 into which a valve stem of the tire may extend through the openings 21. The usual recesses and bolt-receiving openings are provided about the rim of the wheel for receiving the usual tire rim and securing lugs.

The invention claimed is:

1. A cast metal disk wheel for automobiles or the like, having a hub portion and a rim portion, an intermediate disk-like portion cast integral therewith and extending therebetween, said disk portion being curved in cross section so as to have an inwardly-extending annular bulging portion, and a plurality of radially-extending ribs cast intermediate said hub and bulging portion and formed integral therewith for strengthening and reinforcing purposes.

2. A cast metal disk wheel for automobiles or the like, having a hub portion and a rim portion, an intermediate disk-like portion cast integral therewith and extending therebetween, said disk portion being curved in cross section so as to have an inwardly-extending annular bulging portion, and a plurality of radially-extending spoke-like ribs intermediate the hub and bulged portion of the disk and the rim and bulged portion of the disk respectively so as to merge into the latter and form in connection therewith continuous supporting spokes between the hub and rim.

3. A cast metal disk wheel for automobiles or the like, having a hub portion and a rim portion, an intermediate disk-like portion cast integral therewith and extending therebetween, said disk portion being curved in cross section so as to have an inwardly-extending annular bulging portion, a plurality of radially-extending ribs cast intermediate said hub and bulging portion and formed integral therewith for strengthening and reinforcing purposes, and a plurality of ribs formed between and connecting said bulged portion of the disk and rim and merging into the former so as to further strengthen and support the rib with respect to the disk portion of the wheel.

In witness whereof I have hereunto affixed my signature.

PETER LAMBERTUS.